Figure 1:
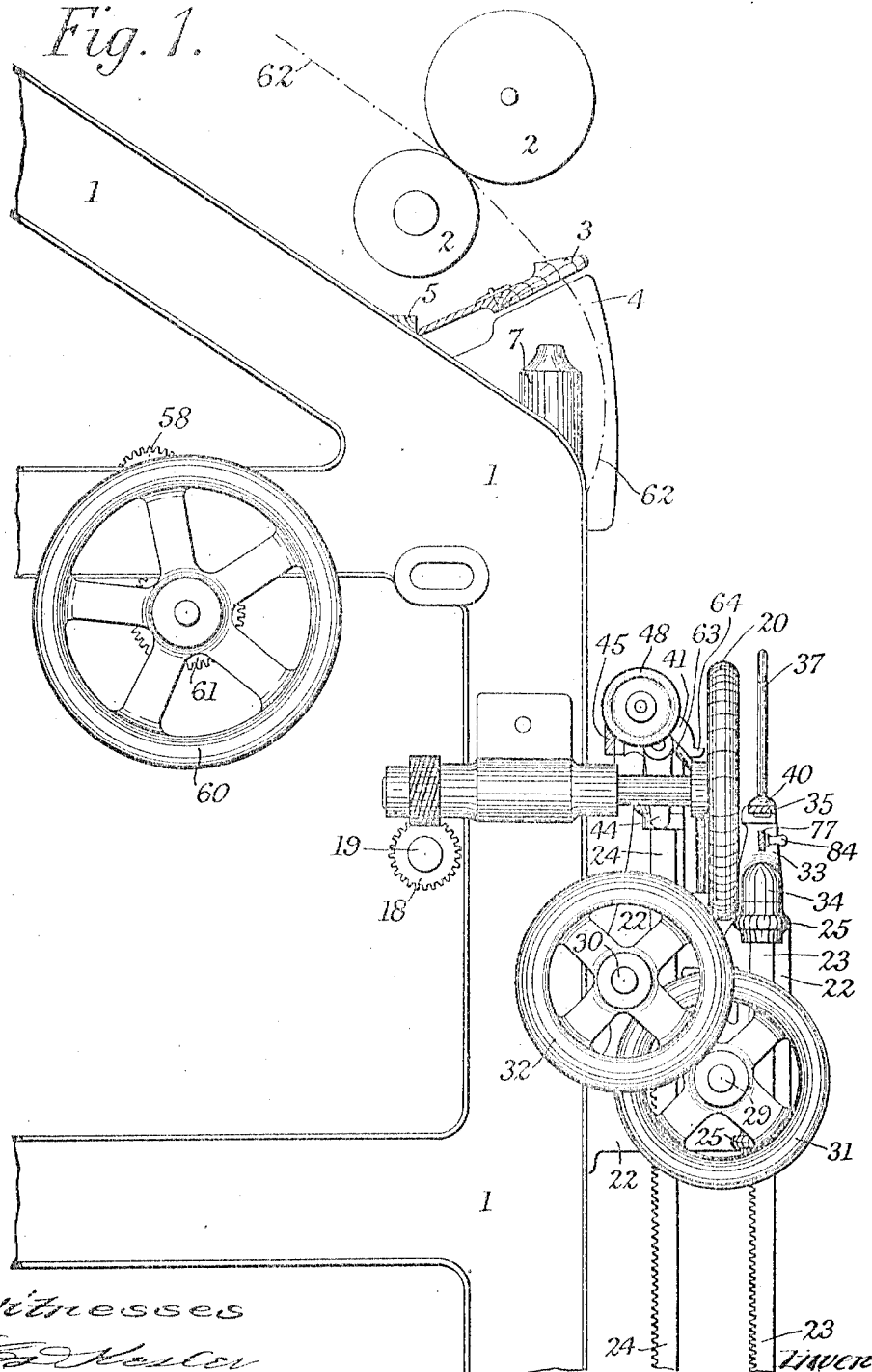

S. SHACKLETON.
DOFFING MECHANISM.
APPLICATION FILED DEC. 26, 1911.

1,079,270. Patented Nov. 18, 1913.
11 SHEETS—SHEET 1.

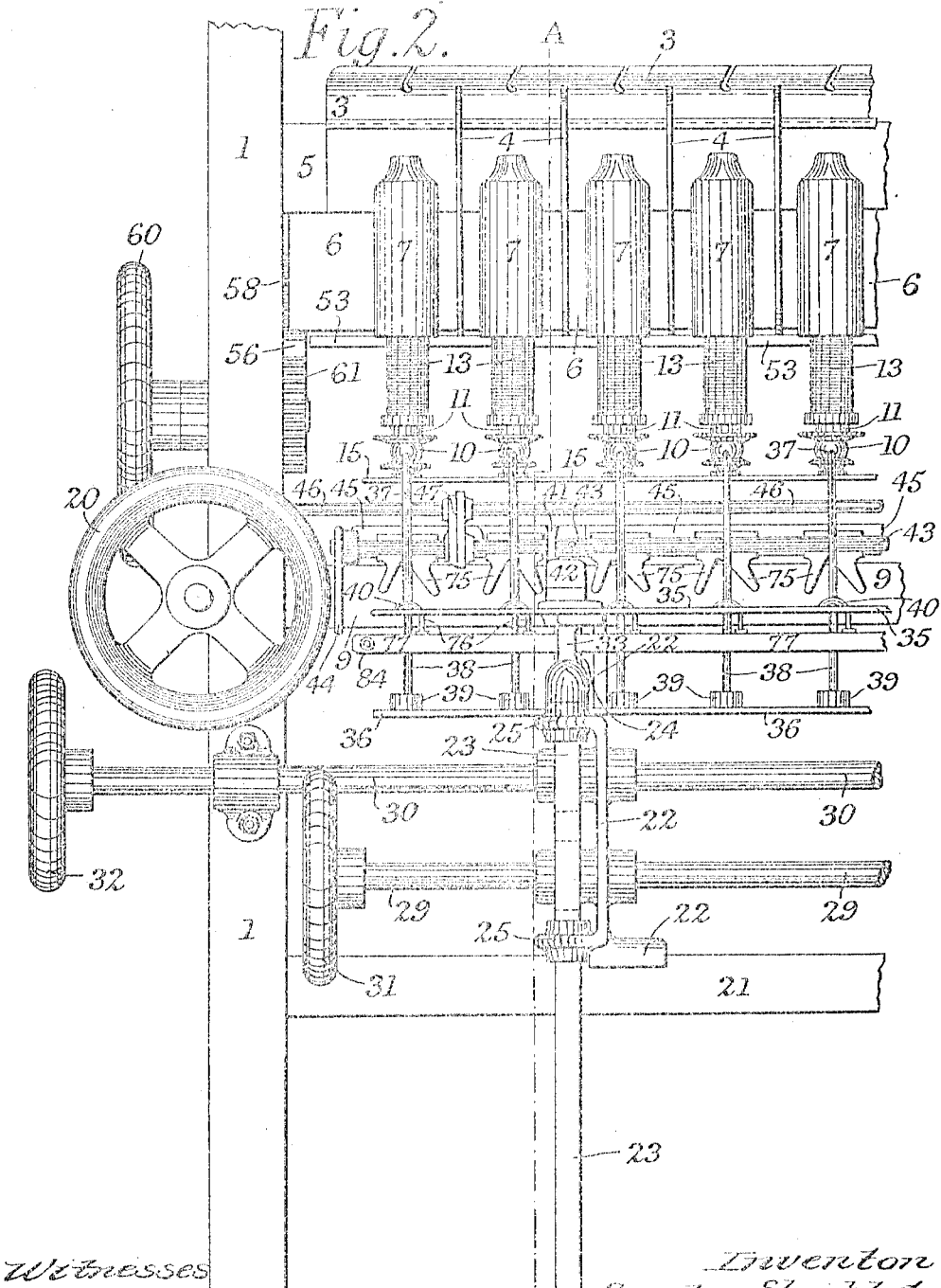

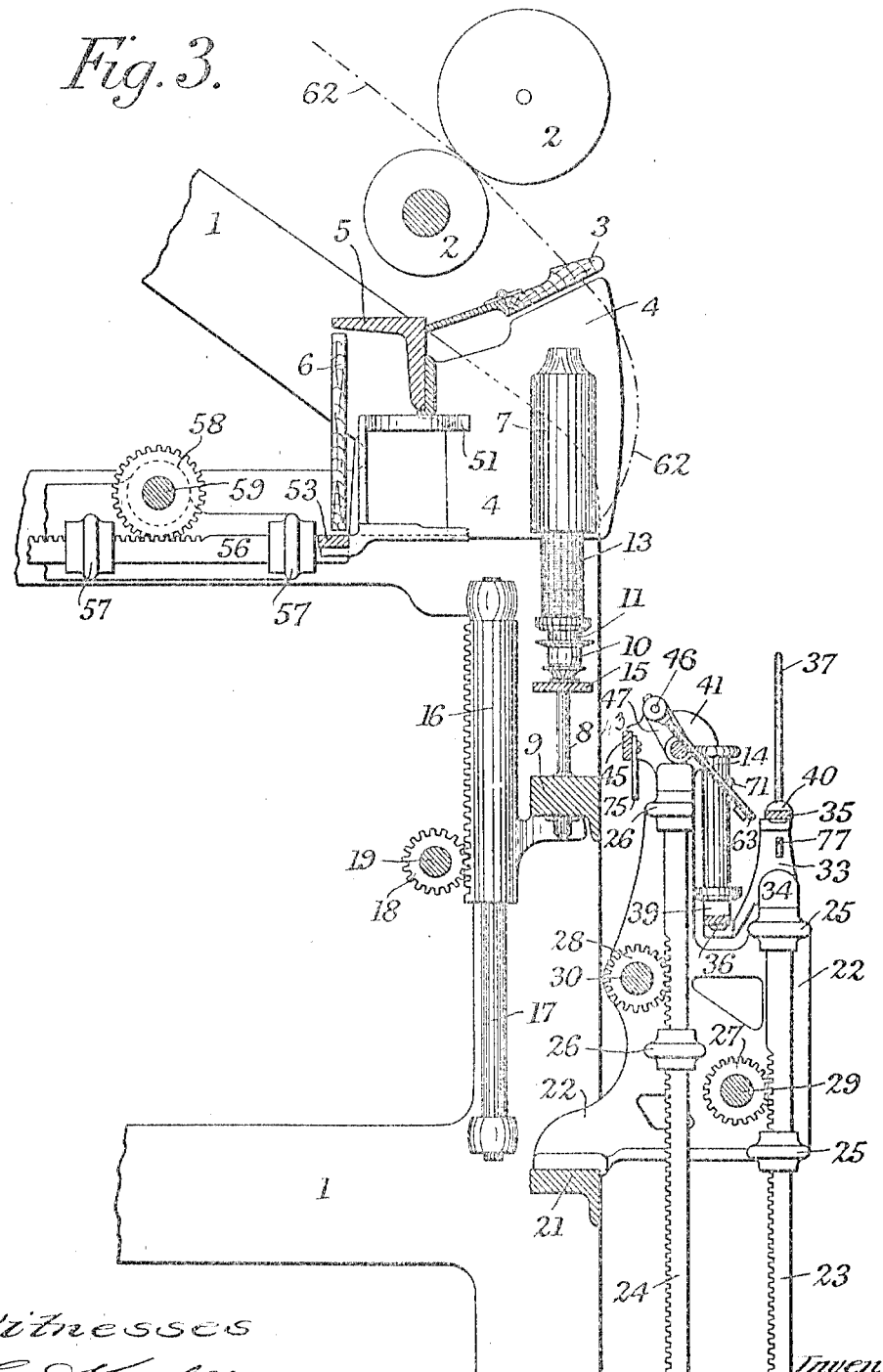

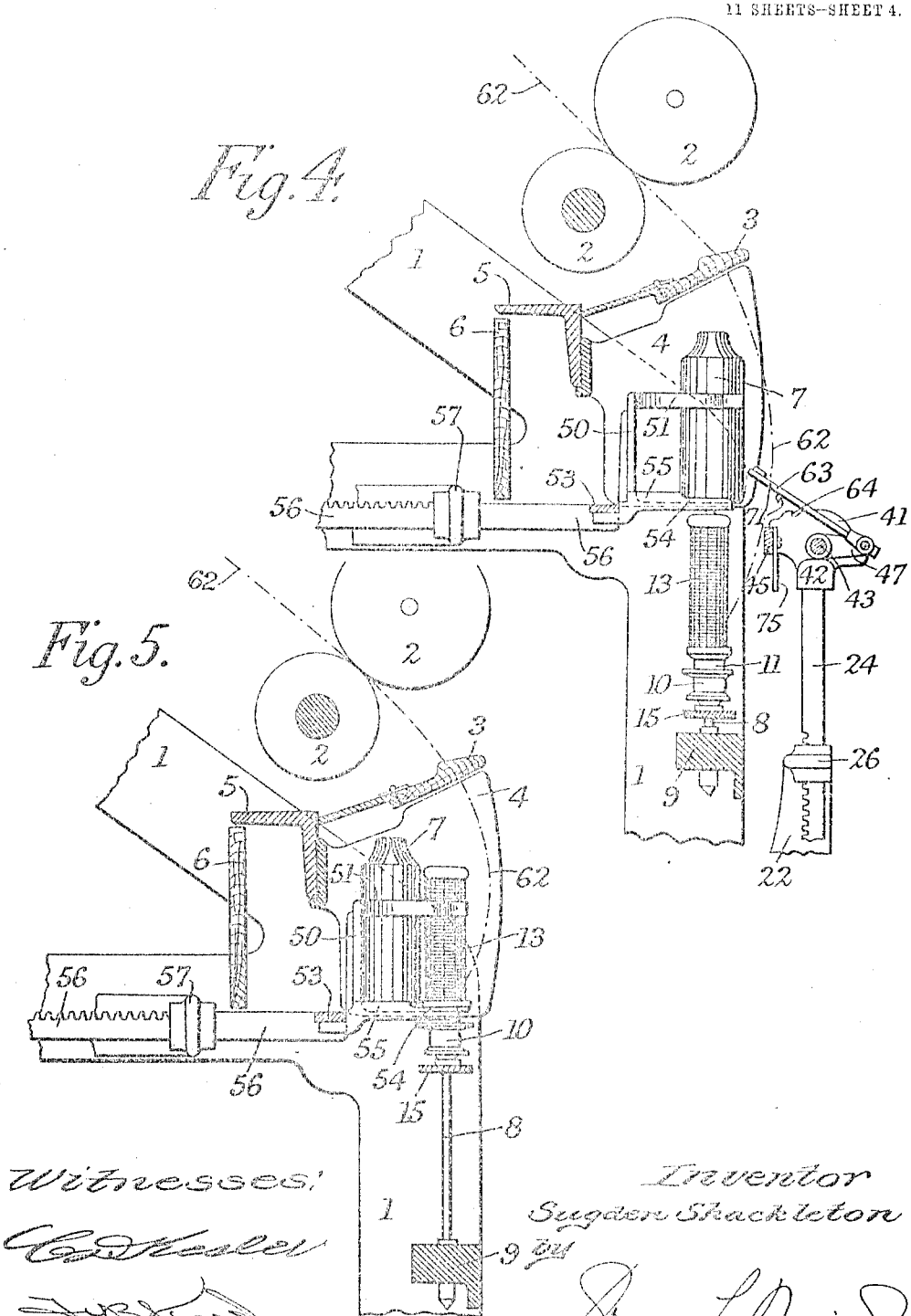

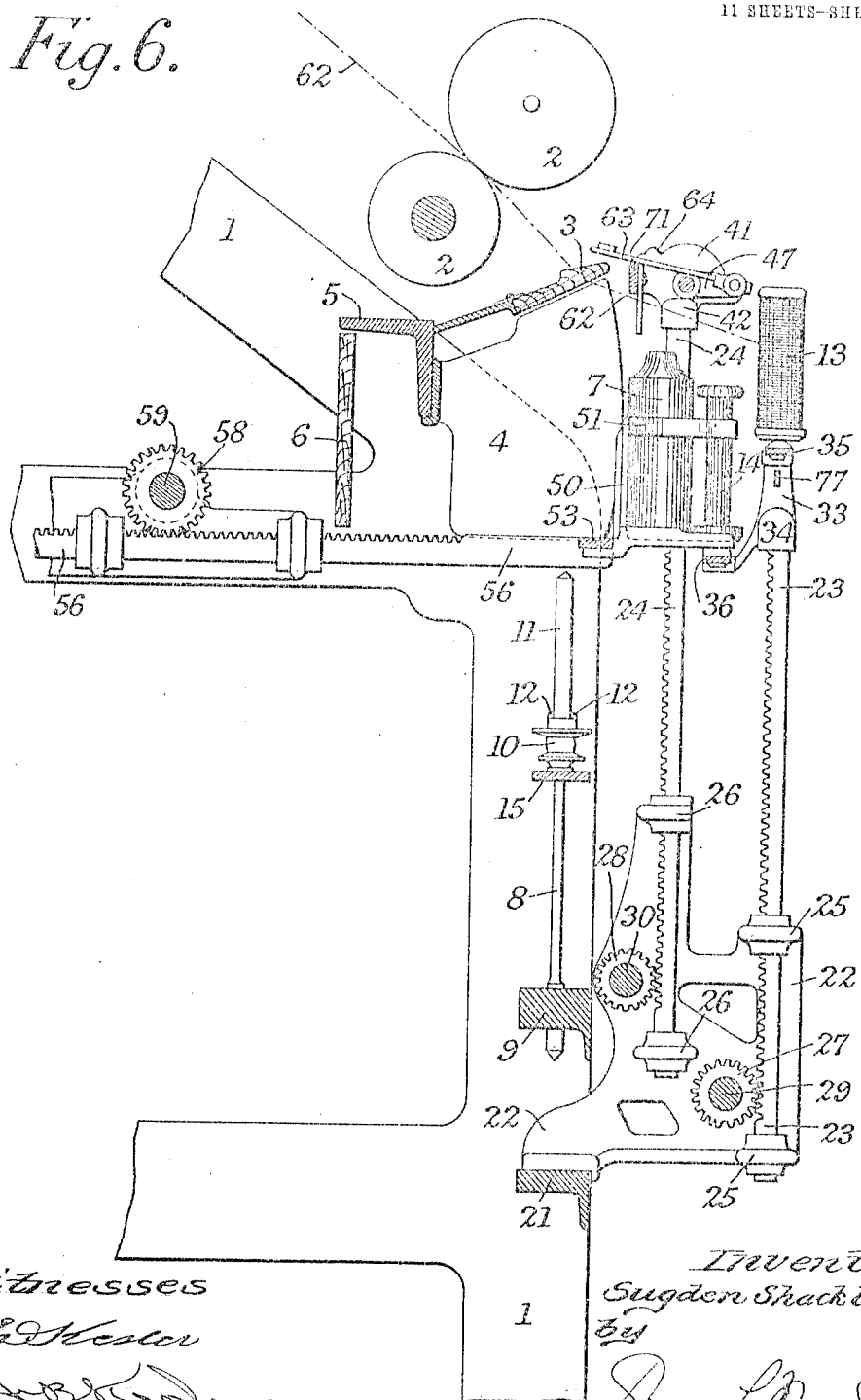

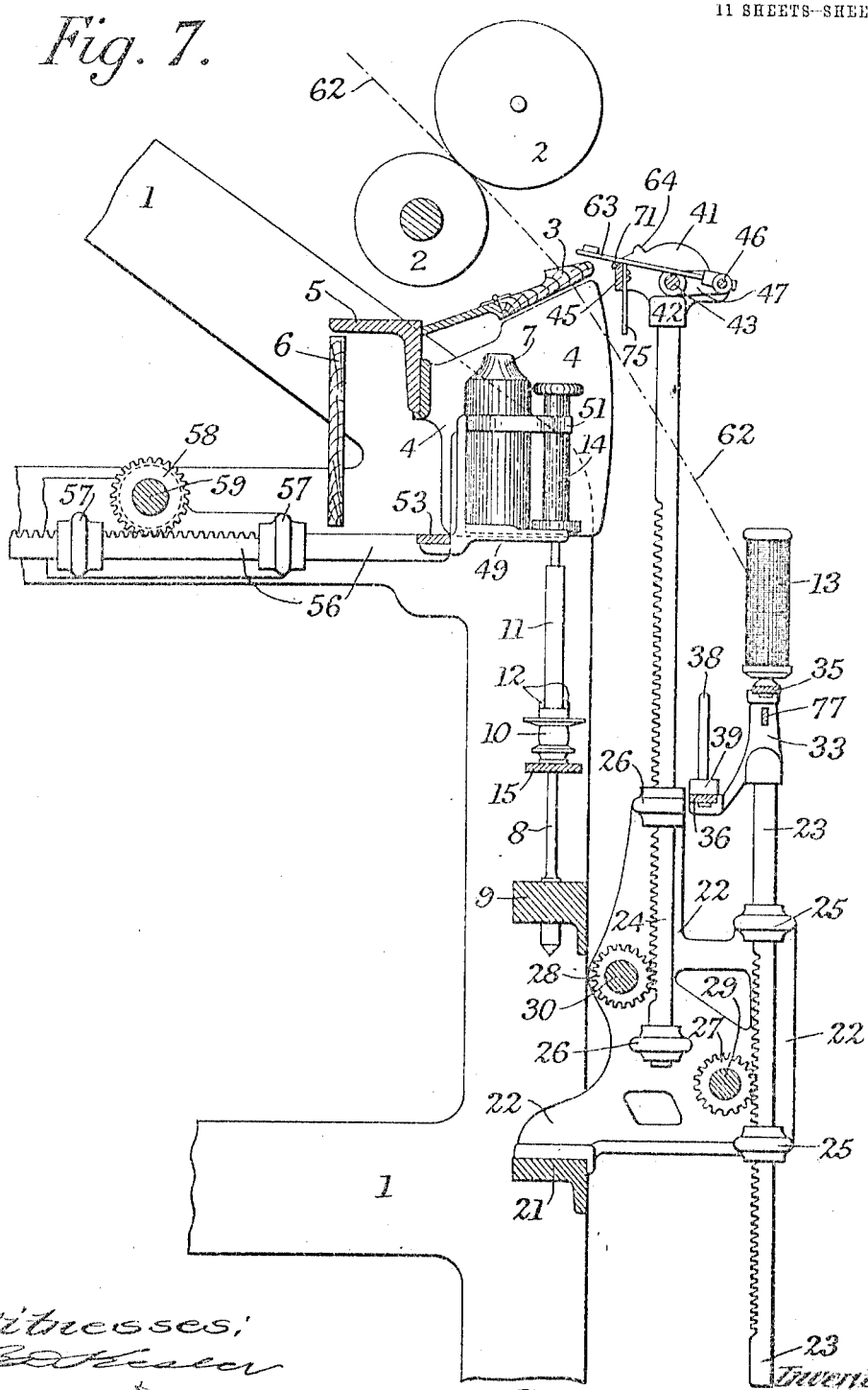

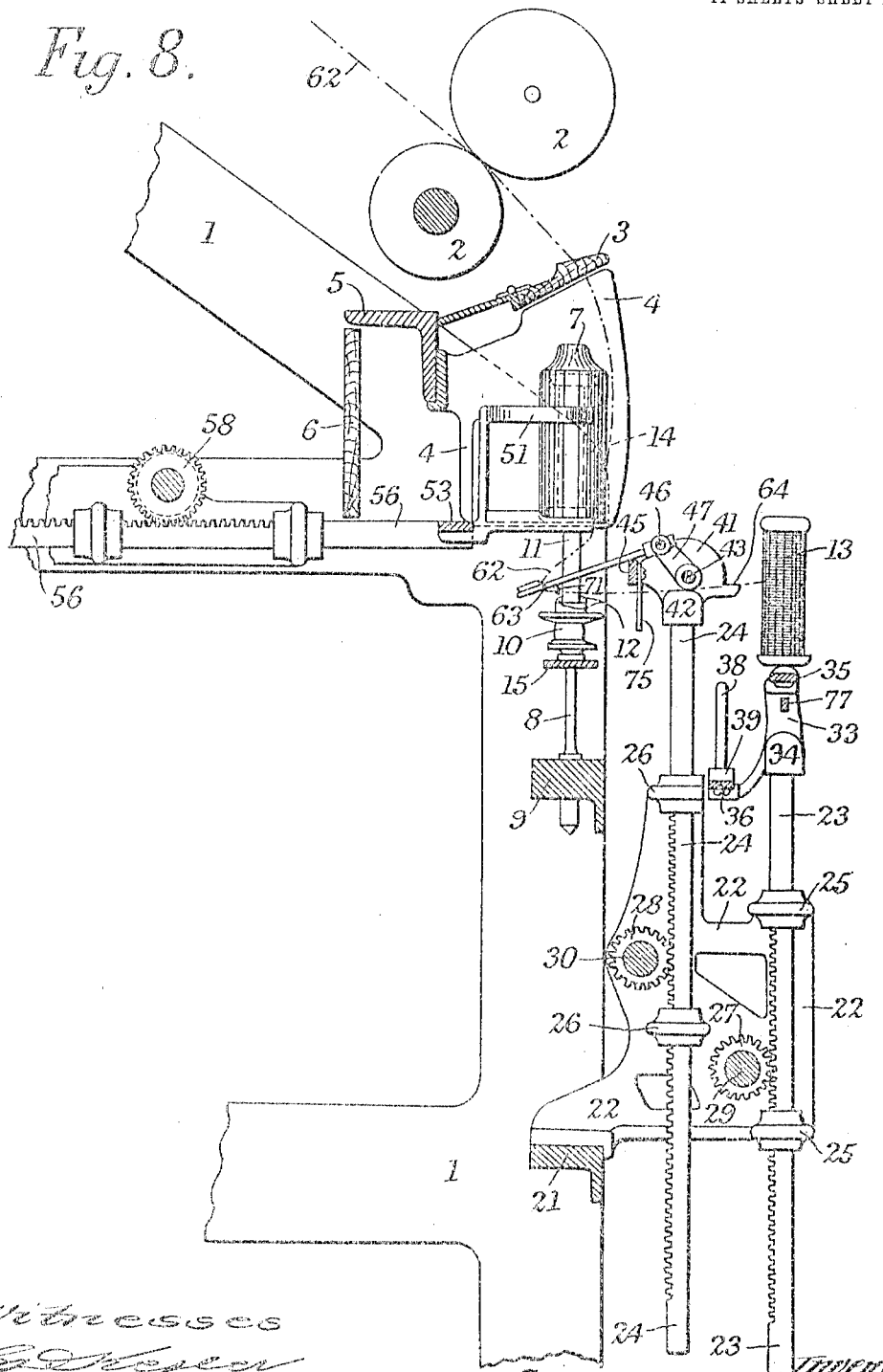

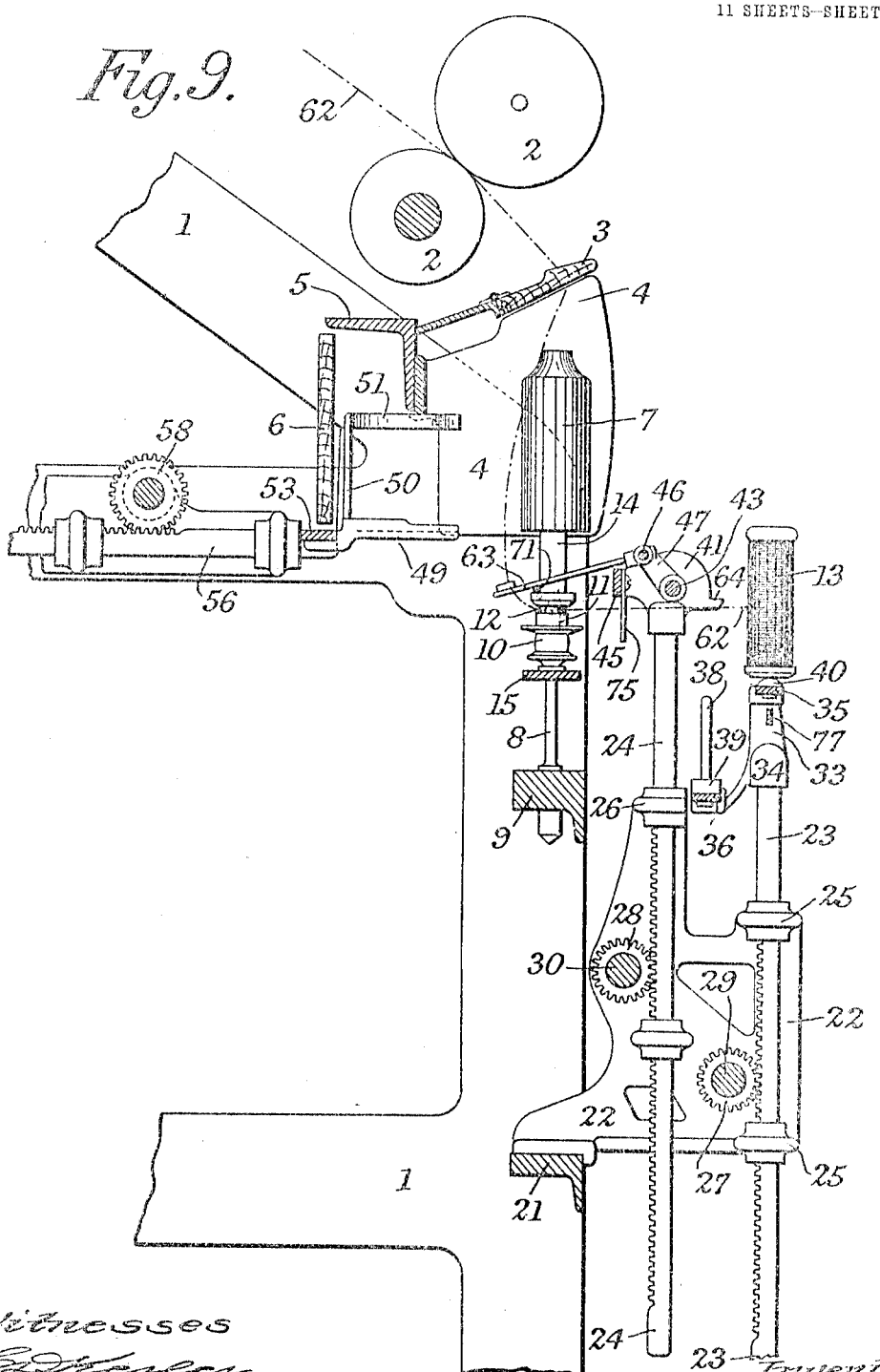

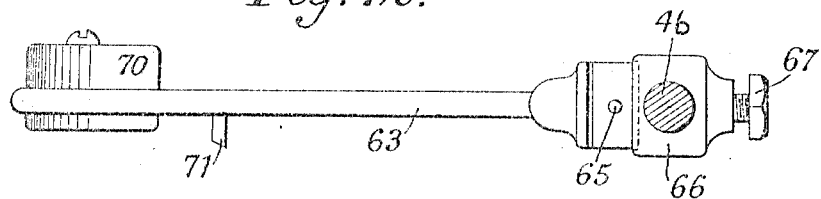
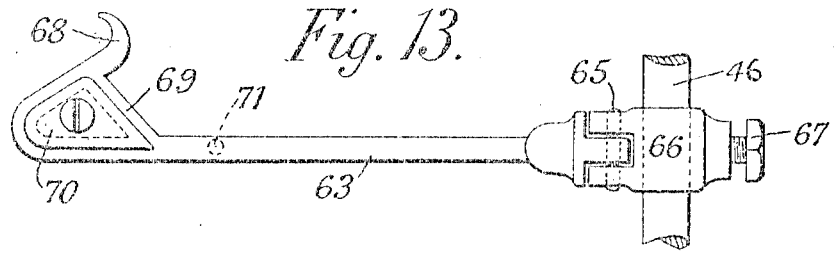
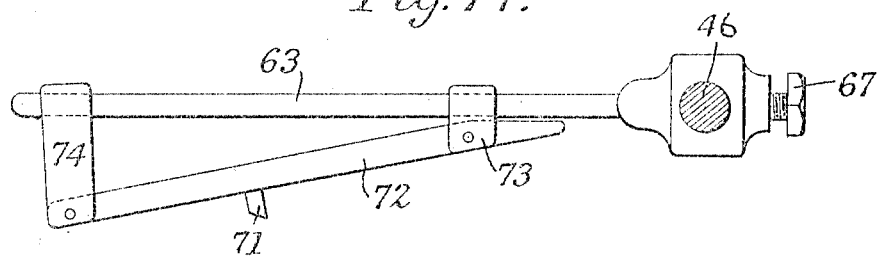
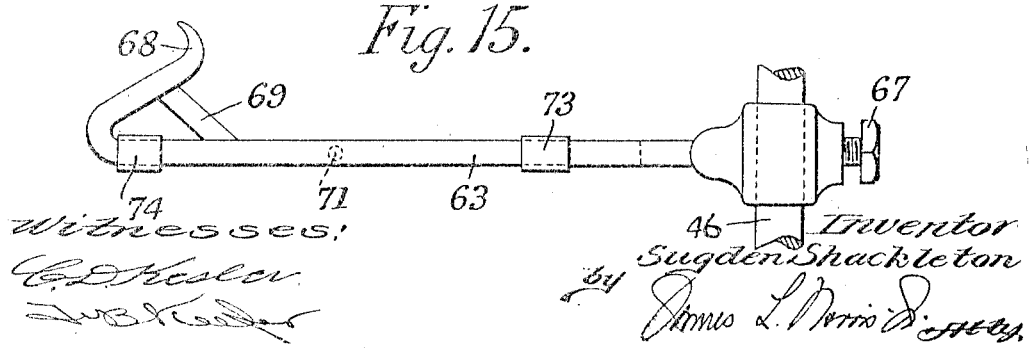

S. SHACKLETON.
DOFFING MECHANISM.
APPLICATION FILED DEC. 26, 1911.

1,079,270.

Patented Nov. 18, 1913.

11 SHEETS—SHEET 11.

Witnesses

Inventor
Sugden Shackleton
by

UNITED STATES PATENT OFFICE.

SUGDEN SHACKLETON, OF MALSIS MOUNT, KEIGHLEY, ENGLAND.

DOFFING MECHANISM.

1,079,270.  Specification of Letters Patent.  Patented Nov. 18, 1913.

Application filed December 26, 1911. Serial No. 667,864.

*To all whom it may concern:*

Be it known that I, SUGDEN SHACKLETON, a subject of the King of Great Britain, residing at Malsis Mount, Keighley, in the county of York, England, have invented certain new and useful Improvements in and Relating to Doffing Mechanism, of which the following is a specification.

This invention is for improvements in and relating to doffing mechanism for cap-spinning, twisting, doubling and analogous machines, of the kind in which, by means of a single series of devices, the caps and full bobbins are removed or doffed from the spindles and the full bobbins are deposited upon a series of pegs, after which a series of empty bobbins upon which yarn or thread is to be spun, twisted or doubled are received by said single series of devices and inserted in place upon said spindles and the caps replaced; and the invention has for its object an improved means for performing the doffing operation as well as for manipulating the yarns or threads from the time that the machine is stopped for doffing until it is restarted for spinning, twisting or doubling.

According to this invention carriers constituted by single members effect positively the removal of the caps and full bobbins from the spindles, conveying said full bobbins away from the spindles to pegs for the reception of same, and serving also to transfer the empty bobbins from retaining pegs onto the spindles and to replace the caps over said empty bobbins.

The invention also comprises improved means for manipulating the yarns or threads during the operation of doffing and for placing the yarns or threads extending between the drawing rollers and the full bobbins into operative connection with the empty bobbins before spinning is re-commenced, means for effecting automatically the driving engagement between the empty bobbins and spindles, and improved means for breaking automatically the yarns or threads between the bobbins which have been doffed and the empty bobbins.

The devices for operating upon the caps and full and empty bobbins consist of a series of carriers which may be mounted in rear of the spindles capable of being moved simultaneously back and forth in a horizontal plane so as to be slid beneath the lower extremities of the caps and bobbins in order to perform the necessary functions as the caps and full and empty bobbins are moved in front of the machine by suitable mechanism. These carriers may each be provided, if desired, with an auxiliary spring-clip serving to retain lightly and thus steady a bobbin while it is being conveyed from one place to another and which is thus prevented from accidental displacement from the carrier; and said carriers may be mounted upon the main framing of the machine in connection with manually-operated mechanism whereby the aforesaid movement through a horizontal plane may be imparted thereto.

In order that the full bobbins may be conveyed by the carriers from the spindles to an inoperative position, and in order that the empty bobbins may be positioned so as to be transferred on to the driving spindles, manually operated means capable of being moved in front of the machine through a vertical plane are provided respectively for the reception of said full bobbins and for the temporary reception of the empty bobbins prior to their transference to the spindles; said means being adapted to be operated in coaction with the carriers.

When doffing is performed in cap-spinning and like frames it is preferable to arrange all the yarns or threads in front of the caps where said yarns or threads will not be liable to foul any of the parts or to become entangled as the caps and bobbins are removed from the spindles, and to effect this and also to enable the yarns or threads to be placed into operative connection with the empty bobbins prior to the re-commencement of spinning, improved manually operated devices may be provided which are capable of being moved vertically and also longitudinally of the machine, in front of the spindles, and which are adapted to be moved into and out of engagement with the yarns or threads (means being provided as is usual to locate the latter symmetrically of the spindles) in order to carry them positively in front of the caps and spindles or to place them positively into operative connection with the empty bobbins; said manually operated thread-manipulating devices also being so constructed and arranged that they serve to insure that driving engagement between all the empty bobbins and their corresponding spindles has been effected before said empty bobbins commence to be filled with yarn or thread.

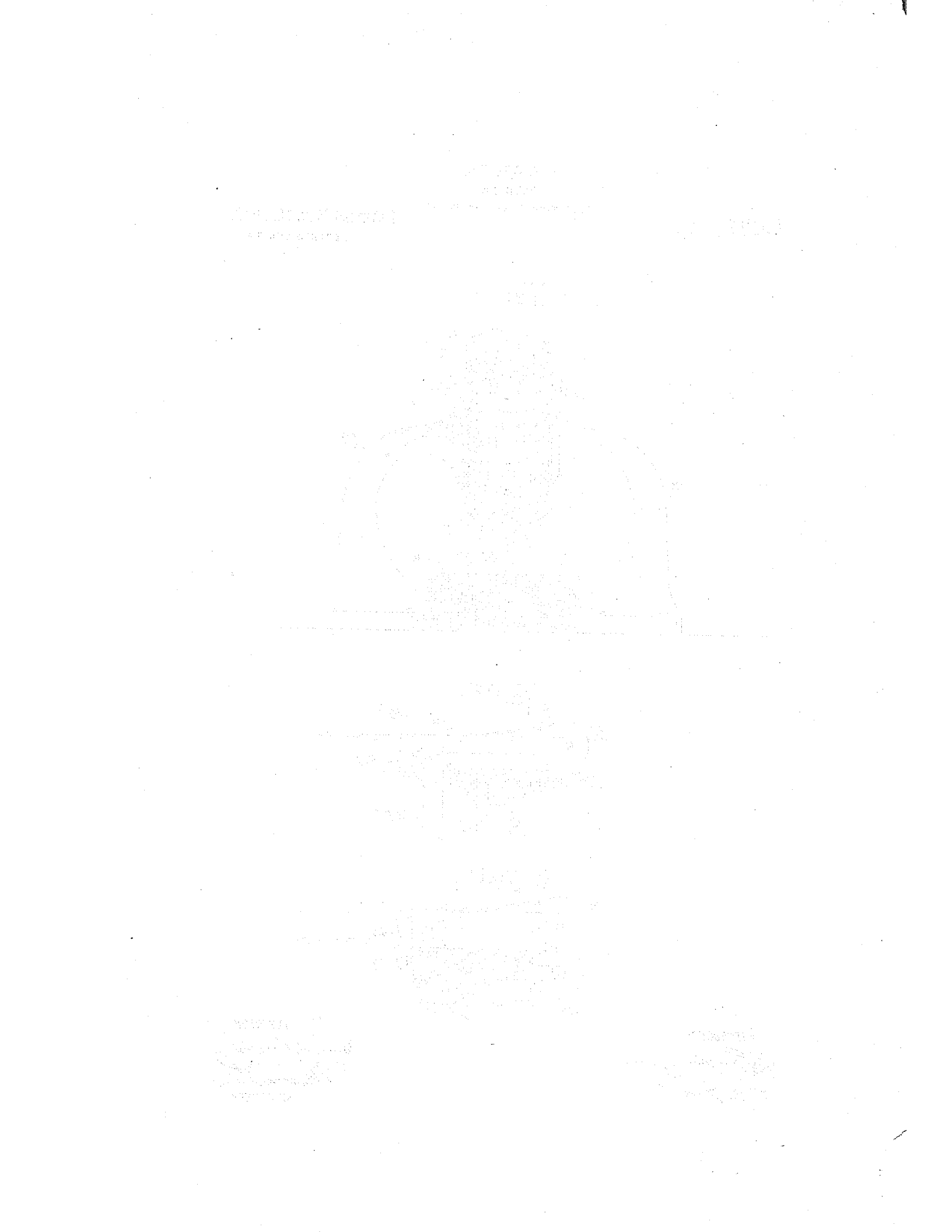

of empty bobbins 14 ... 14 which are to replace the full bobbins 13 13 when the latter have been doffed, as will be hereafter described.

39 are small cylindrical distance pieces serving to maintain the empty bobbins 14 on the pegs 38 at a convenient distance above the bar 36, and 40 are a series of convex bearing or antifriction blocks at the lower extremities of the pegs 37 and which serve to permit the full bobbins to rotate freely, if desired, upon the pegs 37.

At the upper extremity of each of the rack pillars or slides 24 a bracket 41 is fixed by means of a lug or collar 42, said brackets 41 carrying a shaft or rod 43 free to be turned in said brackets 41 by means of a handle-lever 44; and at their rear or inner portions said brackets 41 may carry rigidly a bar 45 to be referred to hereafter. The rod 43 carries a secondary rod or rock-shaft 46 by means of arms or levers 47 which are securely fixed to said rod 43 and which have apertured free extremities through which said rock-shaft 46 passes and in which said rock-shaft is adapted to be moved both longitudinally and rotatably on its axis by means of a hand-wheel 48 or other suitable device. The rod 43, rock-shaft 46 and bar 45 are therefore all carried by the brackets 41 at the heads of the rack pillars or slides 24 and are thus capable of being reciprocated bodily in front of the machine.

Figure 10:
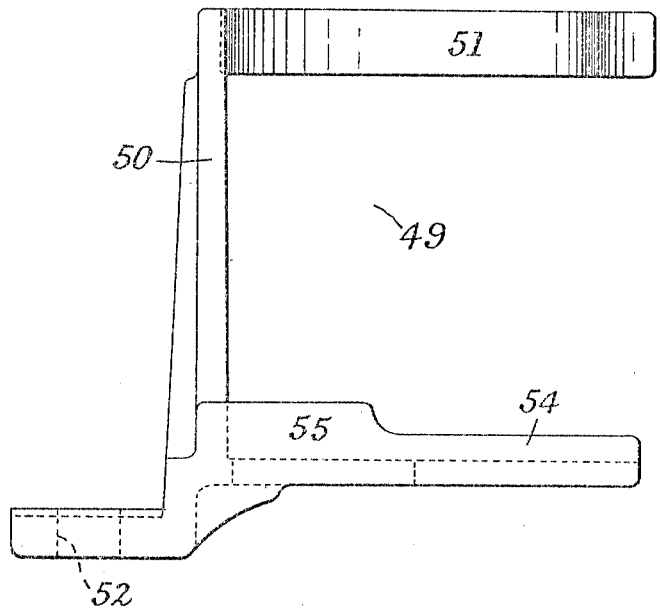
Figure 11:
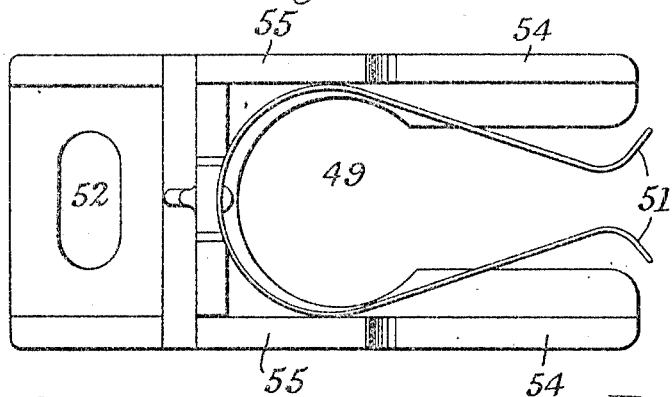
Figure 16:
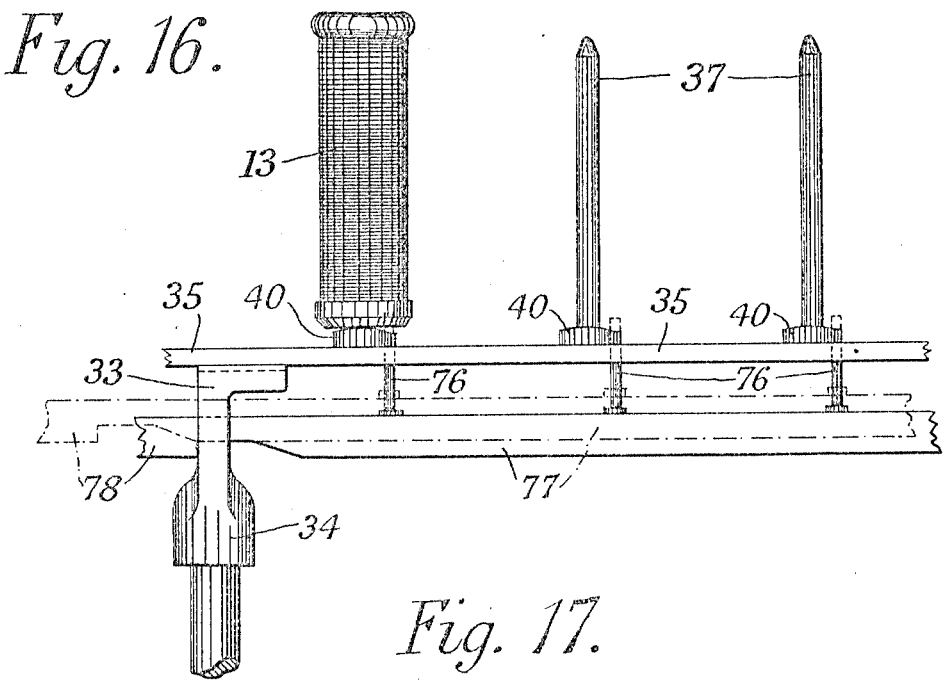
Figure 17:
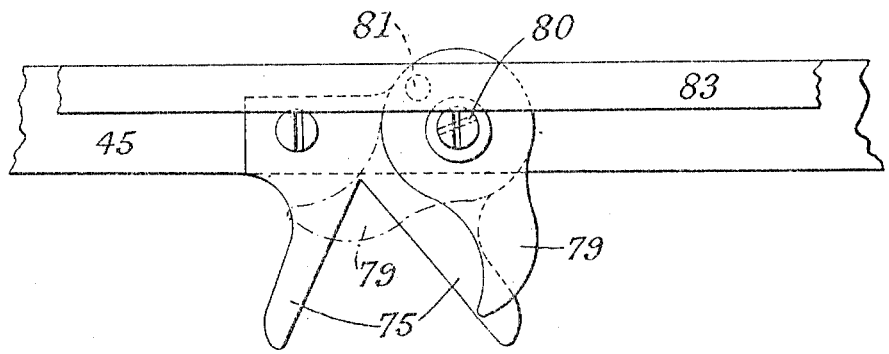
Figure 18:
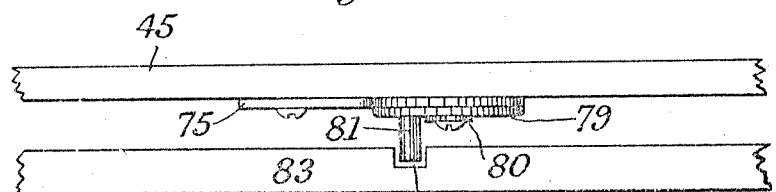

In order to transfer the caps 7 and full bobbins 13 from the spindles 8 and replace the full bobbins by the empty bobbins 14 and also to replace the caps 7 in position over said empty bobbins 14, a special form of carrier 49 is employed. This carrier 49 is illustrated in detail in Figs. 10 and 11, and may consist of a horizontal casting having an upwardly projecting integral stem 50 to which an auxiliary steadying device such as a spring-clip 51 is fixed. These carriers support but do not grip the caps or the bobbins. At the rear of each of said horizontal castings a lug having a slot 52 is formed whereby said carriers may be attached to a bar 53, each at a point in rear of a spindle 8, while the forward portion or base of said casting consists of a pair of horizontal flat limbs or arms 54, 54, having marginal upwardly extending flanges 55, 55, and surrounding a substantially keyhole-shaped aperture. The bar 53, which carries the series of carriers 49 is fixed at each end, and intermediately also if necessary, to horizontally mounted rack bars or slides 56 arranged in guides 57 integral with or attached to the frame 1 of the machine, said rack slides 6 being adapted to be reciprocated forwardly and backwardly within the guides 57 by means of pinions 58 fast upon a shaft 59 extending in suitable bearings longitudinally of the machine, in rear of said board or baffle 6, and operated by means of a hand-wheel 60 and pinion 61 which meshes with the toothed underside (not shown), of one of the rack-slides 56.

It is preferable, when the operation of doffing is performed in cap-spinning frames, to keep all the yarns or threads 62 to the front of the caps where they will not be liable to foul any of the parts or become entangled as the caps or bobbins are removed from the spindles, and to effect this and also to enable the ends of the yarns or threads to be secured to the empty bobbins, what is hereinafter termed thread-conveyer mechanism is employed. This mechanism may comprise a series of hooked rods or conveyers 63, (see Figs. 12 and 13,) which are mounted, one in front of each full bobbin 13, upon the aforesaid secondary rod or rock-shaft 46, which is carried so as to be capable of being slid longitudinally as well as capable of being oscillated or moved angularly in the arms or levers 47, the latter being adapted to be moved angularly by the shaft or rod 43, as described above, lugs or stops 64 on the brackets 41 limiting said angular movement of the arms or levers 47 in a direction outwardly of or away from the machine. The conveyers 63 serve a double purpose and are accordingly of special formation.

One form of conveyer is illustrated in Figs. 12 and 13 and a slightly modified form is illustrated in Figs. 14 and 15.

In the form shown in Figs. 12 and 13 each conveyer 63 consists of a rod hooked at its outer end and attached or hinged at its inner end by means of a pin 65 to a bracket 66 secured by a set screw 67 to rod 46. At its outer end each conveyer is formed with a re-curved hooked limb 68 and a cross member 69 bridging the limb 68 and the body portion 63 of the conveyer, and further, a weight 70 is attached at said hooked outer end of each conveyer and a beveled or angular peg 71 projects below each conveyer 63. During one step of the doffing operation these conveyers 63 are caused to rest with pegs 71 upon the lower flanges of the empty bobbins 14 (Fig. 9) when the latter have been placed upon the spindles 8, and the hinged joint 65 which permits limited angular movement of each conveyer 63 relatively to its corresponding bracket 66 is provided in order to compensate for any inequalities in the height of said flanges.

A modified form of compensating hinge joint is shown in Figs. 14 and 15, and consists of a supplementary arm 72 hinged at 73 to rod 63 and having at its outer extremity an inverted U-shaped guide 74 loosely embracing the extremity of rod 63. The peg 71 is fixed on the hinged supplementary arm 72 instead of the underside "backed" slightly so as to permit the bobbins 13 to unwind as they are lowered and consequently prevent undue tension in the yarns or threads.

By means of handwheel 60 and intermediate gearing the horizontal rack bars or slides 56 and the bar 55 are advanced until the forward limbs 54, 54, of each carrier 49 are presented beneath the mutually adjacent cap 7 as shown in Fig. 4, after which the conveyer mechanism is raised until the ends of the conveyers are above the caps 7 when the lever 44 is operated to move the levers or arms 47 and hence also the conveyers 63 a short distance inward after which the rockshaft 46 is moved longitudinally to the left to disengage the conveyers 63 from the yarns or threads 62 and when the conveyers are free therefrom the lever 44 is operated to oscillate the rod 43 in the reverse direction so as to swing the arms 47 and thread conveyers 63 outward when the whole of the conveyer mechanism is raised by turning handwheel 32 until the thread-conveyers are above the thread board 3, the thread-conveyers 63 being manipulated by turning handwheel 48 on shaft 46 until they rest on top of the thread board 3, as shown in Fig. 6. The handwheel 60 is then turned to bring the carriers 49 forward until the caps 7 rest at the back of the carriers and above the circular portion of the key-hole-shaped apertures in the base of same. The spindle rail 9 is lowered, by turning the handwheel 20, until the spindles 8 are completely withdrawn from within the caps 7 and the carriers 49 are drawn back carrying the caps 7 with them away from above the full bobbins 13. The full bobbins 13 have now to be removed from the tubes 11, and to effect this the spindle rail 9 is raised and after it the lifter plate 15 is also raised, bringing the full bobbins 13 level with and immediately in front of the caps 7. The carriers 49 are once more advanced and the forward limbs 54, 54, pass beneath the full bobbins 13 which are seized by the auxiliary steadying spring-clips 51 and are retained upon the flanged forward limbs of carriers 49 immediately in front of their corresponding caps 7, as shown in Fig. 5. The spindle rail 9 and lifter-plate 15 are then lowered to the bottom of the frame in order to withdraw the spindles 8 and tubes 11 from within the full bobbins 13 and in order to permit the carriers 49 to pass over the tops of tubes 11. After the spindles 8 have been withdrawn from the full bobbins 13 the carriers supporting the latter together with the caps 7 are advanced until the central openings or bores of the full bobbins 13 are co-axial above the pegs 37, and the bar 35 is moved vertically upward by turning handwheel 31 in a counter-clockwise direction until the pegs 37 are well inserted in the central openings of the full bobbins 13. The carriers 49 are then withdrawn, thus releasing the full bobbins 13 from the retaining spring-clips 51 and allowing the full bobbins 13 to drop freely on to the pegs 37. After the full bobbins 13 have been transferred to the pegs 37 the handwheel 31 is turned still farther in a counter-clockwise direction in order to raise the bar 36 and pegs 38 with the empty bobbins 14 upon them until the latter are in front of the caps 7 and level with the horizontal forward members or limbs 54 of carriers 49. The carriers 49 are then advanced once more until the forward limbs 54 pass beneath the lower extremities of the empty bobbins 14 which are seized and held lightly by the spring clips 51 which retain the empty bobbins 14 upon the carriers 49 in front of the caps 7, as shown in Fig. 6. These spring-clips 51 serve as auxiliary steadying devices for the full and empty bobbins respectively when resting upon the carriers in front of the caps and when being transferred from the spindles to the pegs or vice versa, and the spring-clips do not grip the caps 7 but are arranged to surround the same loosely. As has been stated above, the empty bobbins 14 are now resting upon the flanged forward limbs 54 of the carriers 49, and in order that said empty bobbins may be set in place upon the driving spindles 8, the bar 36 is lowered to withdraw the pegs 38 from within the empty bobbins and the carriers now holding the caps and empty bobbins are drawn back until the central openings or bores of the empty bobbins 14 are co-axially above the driving spindles 8 and tubes 11. By turning hand wheel 20 the spindle rail 9 is raised and the spindles 8 and tubes 11 are inserted in the empty bobbins 14. The carriers 49 are then further withdrawn permitting the empty bobbins 14 to fall freely onto the driving spindles 8 and tubes 11, and then the spindle-rail 9 is lowered and the carriers 49 are once more advanced, bringing the caps 7 into position above the empty bobbins 14 after which the spindles are raised to the normal position within the empty bobbins and are inserted in the caps.

When the caps have been placed upon the spindles the lifter-plate 15 is raised in order to carry the empty bobbins 14 up through the circular apertures of the slots in carriers 49 and into the caps, and the carriers 49 are then withdrawn slightly so as to place the flanged forward limbs 54 beneath the empty bobbins 14 which are caused to rest thereupon, as shown in Fig. 8, by lowering the lifter-plate 15.

The next step is to place the lengths of yarn or thread 62 extending between the full bobbins 13 and the "nip" of each set of drawing rollers 2, 2, on to the tops of the driving pegs 12, 12, of each tube 11, as shown in Fig. 8. In order to effect this J. H. SMEDLEY.
PUSH BUTTON SWITCH.
APPLICATION FILED MAR. 26, 1913.
1,079,271.
Patented Nov. 18, 1913.
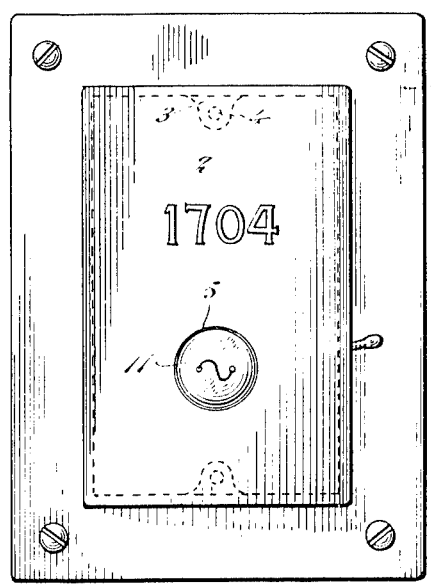
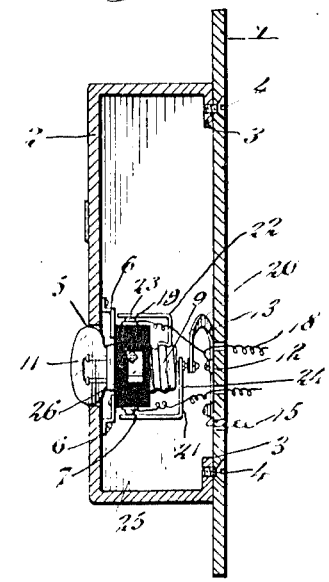
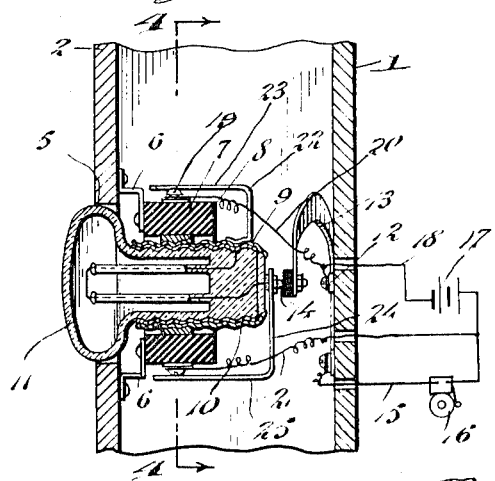
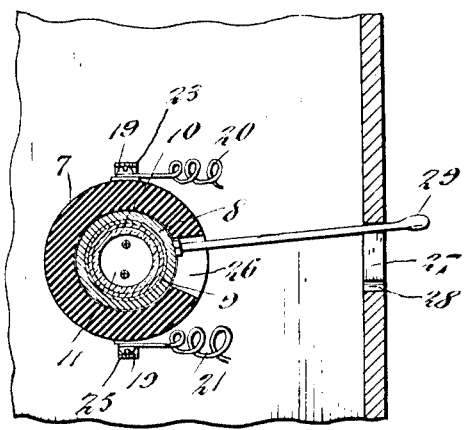
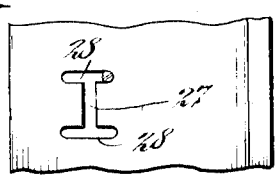
Inventor
Joseph H. Smedley,
By Victor J. Evans
Attorney
Witnesses